(12) United States Patent
Goriparti et al.

(10) Patent No.: US 12,300,229 B2
(45) Date of Patent: May 13, 2025

(54) METHOD AND AN APPARATUS FOR EXECUTING OPERATION/S ON DEVICE/S

(71) Applicant: KIDDE FIRE PROTECTION, LLC, Bradenton, FL (US)

(72) Inventors: Anjaneyulu Goriparti, Telangana (IN); Pratibha Kothakota, Telangana (IN)

(73) Assignee: KIDDE FIRE PROTECTION, LLC, Bradenton, FL (US)

( * ) Notice: Subject to any disclaimer, the term of this patent is extended or adjusted under 35 U.S.C. 154(b) by 461 days.

(21) Appl. No.: 17/770,885

(22) PCT Filed: Sep. 29, 2020

(86) PCT No.: PCT/IB2020/059082
§ 371 (c)(1),
(2) Date: Apr. 21, 2022

(87) PCT Pub. No.: WO2021/079215
PCT Pub. Date: Apr. 29, 2021

(65) Prior Publication Data
US 2022/0392447 A1 Dec. 8, 2022

(30) Foreign Application Priority Data
Oct. 23, 2019 (IN) .............................. 201911043115

(51) Int. Cl.
*G10L 15/22* (2006.01)
*G06F 3/16* (2006.01)
(Continued)

(52) U.S. Cl.
CPC .............. *G10L 15/22* (2013.01); *G06F 3/167* (2013.01); *G10L 15/28* (2013.01); *G08B 29/14* (2013.01); *G10L 2015/223* (2013.01)

(58) Field of Classification Search
CPC ......... G10L 15/22; G10L 3/167; G10L 15/28; G10L 2015/223; G10L 15/063;
(Continued)

(56) References Cited

U.S. PATENT DOCUMENTS 10,854,196 B1 * 12/2020 Parker .................... G06Q 10/10
10,978,068 B2 * 4/2021 Kim ...................... G06F 3/0483
(Continued)

FOREIGN PATENT DOCUMENTS

CN 100405370 C * 7/2008 ............. G10L 15/30
CN 104769668 A * 7/2015 ............. G10L 15/02
(Continued)

OTHER PUBLICATIONS

International Search Report for Application No. PCT/IB20/059082; Issued Mar. 5, 2021; 8 Pages.
(Continued)

*Primary Examiner* — Mohammad K Islam
(74) *Attorney, Agent, or Firm* — CANTOR COLBURN LLP (57) ABSTRACT

Aspects of the invention are directed towards an apparatus and method for executing operation/s on device/s. One or more embodiments of the invention describe the method comprising steps of receiving a voice command from a user for enabling one or more devices to execute an operation and determining validity of the voice command received from the user. The method further describes steps of converting the voice command to a generic command based on the validity of the command and transmitting the generic command for enabling the one or more devices to execute the operation.

15 Claims, 4 Drawing Sheets

(51) Int. Cl.
*G08B 29/14* (2006.01)
*G10L 15/28* (2013.01)

(58) Field of Classification Search
CPC ......... G10L 15/26; G10L 15/30; G10L 15/32; G10L 2015/0635; G08B 29/14
See application file for complete search history.

(56) References Cited

U.S. PATENT DOCUMENTS

| | | | | |
|---|---|---|---|---|
| 11,031,010 | B2* | 6/2021 | Ji | G10L 15/22 |
| 11,721,332 | B1* | 8/2023 | Mokady | G06Q 30/0641 |
| | | | | 704/275 |
| 2008/0154611 | A1* | 6/2008 | Evermann | G06F 16/957 |
| | | | | 707/E17.119 |
| 2012/0179457 | A1* | 7/2012 | Newman | G10L 15/30 |
| | | | | 704/E15.047 |
| 2013/0124207 | A1* | 5/2013 | Sarin | G06F 3/167 |
| | | | | 704/E11.001 |
| 2014/0330569 | A1* | 11/2014 | Kolavennu | G10L 15/1815 |
| | | | | 704/275 |
| 2016/0127487 | A1* | 5/2016 | Shah | G06F 11/3086 |
| | | | | 709/224 |
| 2017/0323646 | A1* | 11/2017 | Kojima | G10L 15/08 |
| 2018/0075712 | A1 | 3/2018 | Field | |
| 2018/0240331 | A1* | 8/2018 | Lee | G08C 17/02 |
| 2019/0114904 | A1 | 4/2019 | Subramanian | |
| 2019/0115024 | A1* | 4/2019 | Kumar | G06F 3/167 |
| 2019/0392836 | A1* | 12/2019 | Kang | G06F 40/30 |
| 2020/0005789 | A1* | 1/2020 | Chae | G10L 15/22 |
| 2020/0118544 | A1* | 4/2020 | Lee | G10L 15/063 |
| 2021/0005190 | A1* | 1/2021 | Ji | G06F 3/167 |
| 2021/0125605 | A1* | 4/2021 | Lee | G06F 40/30 |
| 2021/0183366 | A1* | 6/2021 | Reinspach | G10L 15/02 |
| 2022/0301567 | A1* | 9/2022 | Girardier | G10L 15/22 |
| 2024/0038221 | A1* | 2/2024 | Novitasari | G10L 15/22 |

FOREIGN PATENT DOCUMENTS

| | | | | |
|---|---|---|---|---|
| CN | 106710587 | A * | 5/2017 | |
| FR | 3011101 | A1 * | 3/2015 | ........... G09B 21/001 |
| JP | 4987203 | B2 * | 7/2012 | ....... G06F 16/24522 |
| WO | 2016205338 | A1 | 12/2016 | |
| WO | WO-2017192770 | A1 * | 11/2017 | ......... G05B 19/0426 |

OTHER PUBLICATIONS

Written Opinion for Application No. PCT/IB20/059082; Issued Mar. 5, 2021; 13 Pages.

* cited by examiner

METHOD AND AN APPARATUS FOR EXECUTING OPERATION/S ON DEVICE/S

CROSS-REFERENCE TO RELATED APPLICATIONS

This application is a 371 U.S. National Stage application of PCT/IB2020/059082, filed Sep. 29, 2020, which claims the benefit of Indian Application No. 201911043115, filed Oct. 23, 2019, both of which are incorporated by reference in their entirety herein.

TECHNICAL FIELD OF INVENTION

The present invention generally relates to fire systems. More particularly, the invention relates to an apparatus and a method for enabling a user to use voice commands to execute operation/s on one or more devices.

BACKGROUND OF THE INVENTION

Safety of people is of utmost importance and to save people from any untoward situation is a major concern. Over a period of time, several preventive measures have been taken to save people from any untoward incidents like smoke/fire/heat/gas breakouts. Such preventive measures may involve deploying several fire/smoke/heat/gas devices in a premises (e.g. building, floors, rooms, museums, hospitals, colleges etc.). Such fire/smoke/heat/gas devices may raise alarm or notify people present in the premises on sensing presence of smoke/fire/heat/gas particles in air.

Further, whenever a user wants a perform an operation on the fire/smoke/heat/gas devices, the user should have knowledge about basic functioning of the fire/smoke/heat/gas devices and should know how an operation on the fire/smoke/heat/gas devices can be performed. Without knowledge of the functioning of the fire/smoke/heat/gas devices and without knowledge of the operation to be performed, the user cannot perform any operation on the fire/smoke/heat/gas devices.

Furthermore, even if a user has knowledge about basic functioning of the fire/smoke/heat/gas devices and know how an operation on the fire/smoke/heat/gas devices can be performed still, the user needs to physically access them to perform any operation. Currently, there does not exist any solution that enables a user to perform an operation on fire/smoke/heat/gas devices without having any knowledge about functioning of the fire/smoke/heat/gas devices and without knowing how an operation on the fire/smoke/heat/gas devices can be performed. A user needs to be separately trained for executing the operations on the fire/smoke/heat/gas devices.

In view of the afore-mentioned problems in the existing solutions, there is a need of an efficient and effective apparatus and a method for providing an easy way that enables a user to perform an operation on fire/smoke/heat/gas devices without having knowledge about functioning of the devices. There is also a need to enable a user to perform an operation on fire/smoke/heat/gas devices without knowing how an operation on them can be performed. There is also a requirement to enable a user to perform an operation on fire/smoke/heat/gas devices without physically accessing them. In order to solve the problems in the existing solutions, an apparatus and a method are disclosed.

SUMMARY OF THE INVENTION

Various embodiments of the invention describe an apparatus for enabling a user to use voice commands for executing operation/s on one or more devices. The apparatus comprises an interface adapted to receive a voice command from a user for enabling one or more devices to execute an operation. The apparatus comprises a validation unit adapted to determine validity of the voice command received from the user. Also, the apparatus further comprises a converter unit adapted to convert the voice command to a generic command based on the validity of the command and a transmitter adapted to transmit the generic command for enabling the one or more devices to execute the operation.

In another embodiment of the invention, the apparatus is a user device communicably connected with a control panel. The apparatus transmits the generic command to the control panel and the control panel transmits the generic command to the one or more devices for enabling the one or more devices to execute the operation.

In a different embodiment of the invention, the apparatus is connected with the control panel through a bluetooth, a universal serial bus (USB), an Ethernet or a serial interface.

In an embodiment of the invention, the apparatus is adapted to receive configuration information for each of the one or more devices and display a list of operations executed by the one or more devices.

In another embodiment of the invention, the apparatus provides a search interface for searching the one or more devices.

In yet another embodiment of the invention, the apparatus is embedded inside a control panel.

In still another embodiment of the invention, the one or more devices execute testing operation, commissioning operation and/or maintenance operation.

In yet another embodiment of the invention, the generic command for executing the operation corresponds to a test command, an activation command, a deactivation command, an enable command, a disable command a restoration command or a report command.

In another embodiment of the invention, the one or more devices executes an operation of generating a troubleshooting report for a period of time when a report command is received.

In an embodiment of the invention, the one or more devices executes an operation of enabling/disabling a feature of the one or more devices when an enable/disable command is received.

In another embodiment of the invention, the one or more devices executes an operation of grouping of devices when an activation command is received.

In another embodiment of the invention, the transmitter is adapted to transmit the generic command if the voice command is valid.

In yet another embodiment of the invention, the interface is adapted to provide a notification to the user if the voice command is not valid.

In still another embodiment of the invention, the one or more devices are fire devices.

Various embodiments of the invention describe a method for enabling a user to use voice commands to execute operation/s on one or more devices. The method comprises steps of receiving a voice command from a user for enabling one or more devices to execute an operation and determining validity of the voice command received from the user. The method further comprises steps of converting the voice command to a generic command based on the validity of the command and transmitting the generic command for enabling the one or more devices to execute the operation.

In another embodiment of the invention, the generic command is transmitted by an apparatus to a control panel and the control panel transmits the generic command to the one or more devices for enabling the one or more devices to execute the operation.

In a different embodiment of the invention, the apparatus is connected with the control panel through a bluetooth, a universal serial bus (USB), an ethernet or a serial interface.

In yet another embodiment of the invention, the apparatus is embedded inside a control panel.

In an embodiment of the invention the one or more devices are fire devices.

In another different embodiment of the invention, a computer readable medium is disclosed for enabling a user to use voice commands to execute operation/s on one or more devices. The computer readable medium comprises one or more processors and a memory coupled to the one or more processors. The memory stores instructions executed by the one or more processors. The one or more processors are configured to receive a voice command from a user for enabling one or more devices to execute an operation and determine validity of the voice command received from the user. The one or more processors are further configured to convert the voice command to a generic command based on the validity of the command and transmit the generic command for enabling the one or more devices to execute the operation.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

Other aspects, advantages, and salient features of the invention will become apparent to those skilled in the art from the following detailed description, which taken in conjunction with the annexed drawings, discloses exemplary embodiments of the invention.

BRIEF DESCRIPTION OF THE DRAWINGS

Corresponding reference numerals indicate corresponding parts throughout the drawings.

DETAILED DESCRIPTION OF THE INVENTION

Described herein is the technology with an apparatus and a method for enabling a user to use voice commands for executing operation/s on one or more devices. The user may provide a voice command to an apparatus and the apparatus may validate the command. In case, the voice command is valid then, the apparatus may convert the voice command to a generic command. The apparatus may transmit the generic command to the one or more devices. On receiving the generic command, the one or more devices may execute an operation.

As used herein, the apparatus may receive a voice command from the user. The apparatus may comprise, but is not limited to, an interface, a transmitter, a receiver, a validation unit, a converter unit, a memory and/or a processor. The apparatus may be a user device. Alternatively, the apparatus may be embedded inside a control panel. A control panel is a device for controlling the operations of the one or more devices in a fire system. As used herein, the user device is associated with the user and may store one or more applications. The user device may be a desktop computer or a hand held device such as a mobile phone with network connectivity. Example of the user device includes a desktop, workstation PC, a laptop, a smart phone, a tablet, a wearable device and the like.

As used herein, the one or more devices may communicate with a control panel through a wired network or wireless network. Further, the user device may communicate with the one or more devices through the control panel. In an exemplary embodiment, the control panel may be a fire control panel, a fire alarm control panel (FACP), a fire alarm control unit (FACU), a fire alarm panel or any such control panel well known in the art. Also, the one or more devices may be connected with each other in a loop. The one or more devices may be any fire device of a fire system, any smoke device in a smoke system, any temperature device, or any such device that is obvious to a person skilled in the art.

As used herein, the operation may be executed by the one or more devices and may refer to installing operations, testing operations, commissioning operations, maintenance operations and/or any such operations that that is obvious to a person skilled in the art.

As used herein, the network may refer to a mesh network, any cellular network (e.g. Global System for Mobile (GSM) network, a Long-Term Evolution (LTE) network, a code-division multiple access (CDMA) network, a narrow-band internet of thing (NB-IoT) technique or category M1 technique), any short-range network (e.g. a bluetooth network, a WiFi network, a ZigBee network) or any such network/technique that is known in the art.

Throughout the specification, reference numeral 102 depicts one or more devices. The reference numerals 102A, 102B, 102C, 102D may be considered as a single device.

Figure 1A:
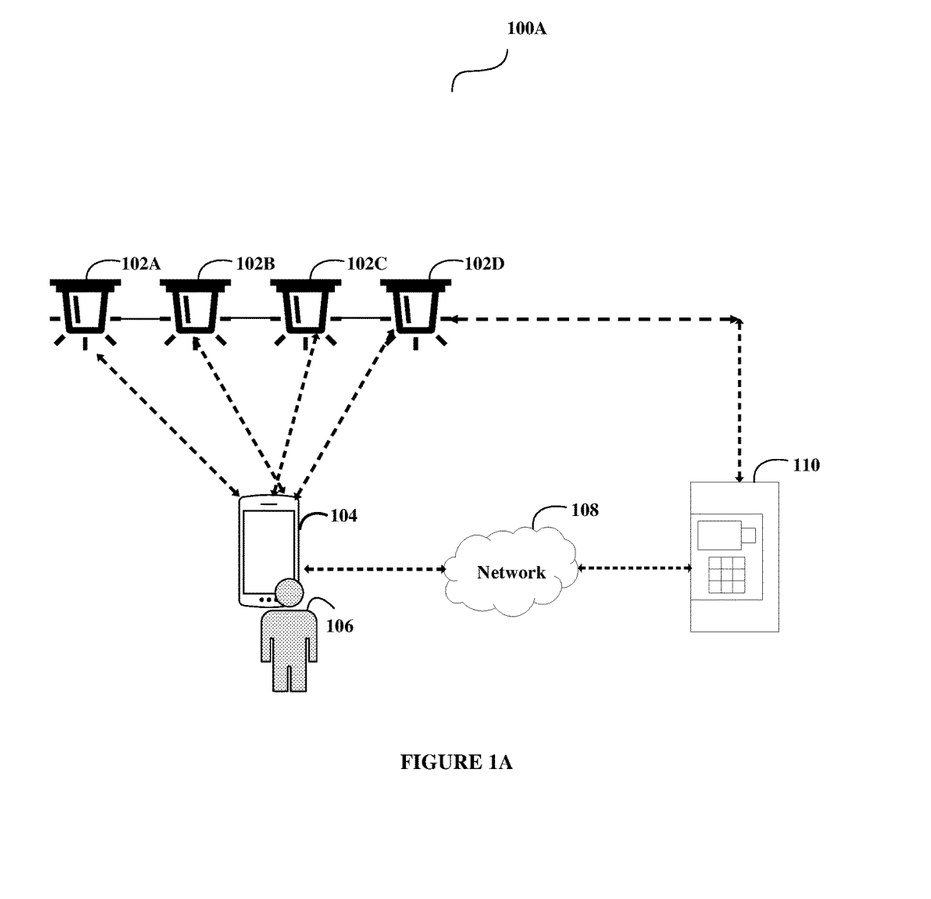
FIG. 1A depicts an exemplary system architecture according to an exemplary embodiment of the invention.

FIG. 1A depicts a system architecture 100A for enabling a user to use voice commands to execute operation/s on one or more devices, according to an exemplary embodiment of the invention. As depicted in FIG. 1A, one or more devices 102 may be communicably connected with a control panel 110 either through a wired network or a wireless network. Further, the control panel 110 may also be communicably connected with an apparatus 104 through a network 108. According to this exemplary embodiment of the invention, the apparatus 104 may be a user device and the apparatus 104 is referred hereinafter as user device 104. In an exemplary embodiment, the control panel 110 may be communicably connected with the user device 104 through a bluetooth of a bluetooth network. In a different exemplary embodiment, the control panel 110 may be communicably connected with the user device 104 through a universal serial bus (USB). In yet another exemplary embodiment, the control panel 110 may be communicably connected with the user device 104 through an Ethernet. In another exemplary embodiment, the control panel 110 may be communicably connected with the user device 104 through a serial interface such as RS232/RS485 and the like. Moreover, a user 106 may be associated with the user device 104. In an exemplary embodiment, the one or more devices 102 may be fire devices of a fire system.

The user 106 may input voice command/s to the user device 104 for enabling the one or more devices 102 to execute an operation. For this, the user 106 may open the application stored in the user device 104 and then may input the voice command/s in an interface of the application. Such an application may be provided by a manufacturer of the one or more devices 102 or a manufacturer of the control panel 110. Further, the voice command/s inputted by the user 106 may be for a particular device or may be a general command for all the devices. As an example, the user 106 may wish to execute a test operation on a device 102A. For this, the user 106 may input a voice command like "TEST 102A" to the user device 104. In the same way, if the user 106 may wish to execute a report operation on all devices 102 then, the user 106 may input a voice command like "TEST ALL" or "TEST 102A-102D" to the user device 104. Also, the user 106 may input a voice command like "Get loop cards from all Nodes", "Get 'LOOP LABEL' devices" or "Get device of type heat, smoke etc." In the similar manner, the user 106 may input several voice commands to the user device 104 for executing a test operation, an activation operation, a deactivation operation, an enable operation, a disable operation, a restoration operation or a report generation operation on any of the devices 102. Moreover, the operations to be executed by the one or more devices 102 may be related to testing operation/s, commissioning operation/s and/or maintenance operation/s of the one or more devices 102. Thereby, the embodiment provides a technical advantage of enabling the user 106 to use voice command for testing the one or more devices 102.

When the user device 104 receives the voice command/s from the user 106, the user device 104 may determine a validity of the voice command/s. In order to determine the validity of the voice command/s, the user device 104 may match the voice command/s received from the user 106 with pre-defined/pre-configured voice commands. The pre-defined/pre-configured voice commands may be defined/configured by a manufacturer of the one or more devices 102 or a manufacturer of the control panel 110. When the voice command/s received from the user 106 do not match with the pre-defined/pre-configured voice commands, then the user device 104 may determine that the voice command/s received from the user 106 is not valid. The user device 104 may notify the user 106 regarding the invalidity of the voice command/s and the user 106 may again provide a voice command/s to the user device 104 based on the notification. And, if the voice command/s received from the user 106 matches with the pre-defined/pre-configured voice commands, the user device 104 may determine that the voice command/s received from the user 106 is valid. If the voice commands is valid, the user device 104 may convert the voice command/s received from the user 106 to a generic command. In an exemplary embodiment, the user device 104 may first convert the voice command/s to a text command if the voice command/s is valid and then the text command may be converted to a generic command (such as an electrical signal or any data/information) that can be transmitted to the control panel 110 over a wireless/wired channel/s as well as understood by the control panel 110 and/or the one or more devices 102.

After the control panel 110 receives the generic command from the user device 104, the control panel 110 may further transmit the generic command to the one or more devices 102. Before transmitting the generic command, the control panel 110 may analyze the generic command and determine an identifier of the one or more devices 102 and accordingly, the control panel 110 may transmit the generic command to an intended device 102 through the wired network or a wired network. When the one or more devices 102 receives the generic command from the control panel 110, the one or more devices 102 may analyze the generic command to determine operation/s to be executed by the one or more devices 102 and may accordingly execute the identified operation.

The generic command and/or the voice command may correspond to a test command for executing a test operation, an activation command for executing an activation operation, a deactivation command for executing a deactivation operation, an enable command for executing a enable operation, a disable command for executing a disable operation, a restoration command for executing a restore operation and/or a report command for executing a report operation on the one or more devices 102. In an exemplary embodiment, the test operation may be performed by a device 102 to check if all or any components of the device 102 is working properly or not. The test operation also may be performed to check if the device 102 is properly connected and in communication with other devices and/or with the control panel 110. The test operation also may be performed to check if the device 102 is correctly performing one or more function/s (such as sensing of temperature or fire in air) as designed to perform.

In an exemplary embodiment, the activation operation may be performed by a device 102 to activate it from a sleep mode to an active mode or may enable it to switch-on. Alternatively, the activation operation may also enable to group one or more devices 102 to execute an operation. In an exemplary embodiment, the deactivation operation may be performed by a device 102 to deactivate it to a sleep mode from a working mode or may enable the it to switch-off. Alternatively, the deactivation operation may also enable to ungroup one or more devices 102.

In an exemplary embodiment, the enable operation may be performed by a device 102 to enable/allow it to turn-on its specific feature/function (such as sensing of temperature or fire in air or to emit heat or to spill water). Similarly, in an exemplary embodiment, the disable operation may be performed by a device 102 to enable it to turn-off/disable its specific feature/function (such as sensing of temperature or fire in air or to emit heat or to spill water). In an exemplary embodiment, the restoration operation may be performed by a device 102 to restore it to its original state when it was installed. In an exemplary embodiment, the report operation may be performed by a device 102 to generate a troubleshooting report for a period of time (such as a weekly, monthly or a yearly report). Although a limited number of voice command/s, generic command's and operation/s have been described herein; however, any other command/s and operation/s are within the scope of this present invention.

An exemplary Table 1 had been provided below to elucidate exemplary voice command/s provided by the user 106 and type of generic command/s corresponding to the voice command/s and an operation to be executed by an intended device 102 based on the generic command.

TABLE 1

| Syntax of Exemplary Voice Command/s provided by User | Type of Voice and/or Generic Command | Intended Device for executing operation | Operation to be Executed by the Intended Device |
|---|---|---|---|
| TEST 102A | Testing command | 102A | Testing of 102A |
| ACTIVATE 102B | Activation command | 102B | Activation of 102B |
| DEACTIVATE 102D | Deactivation command | 102D | Deactivation of 102D |
| ENABLE 102C F1 | Enable command | 102C | Enablement of Feature F1 of 102C by 102C |
| DISABLE 102D F3 | Disable command | 102D | Disablement of Feature F3 of 102D by 102D |
| RESTORE 102A & 102B | Restoration command | 102A & 102B | Restoration of 102A & 102B |
| REPORT ALL | Reporting command | 102A, 102B, 102C, 102D | Reporting from all devices |

As can be seen in exemplary Table 1, voice command "TEST 102A" may be a testing command intended for device 102A to execute a test operation. The voice command "ACTIVATE 102B" may be an activation command intended for device 102B to execute an activation operation. Also, the voice command "DEACTIVATE 102D" may be a de-activation command intended for device 102D to execute a de-activation operation. Further, the voice command "ENABLE 102C F1" may be an enable command intended for device 102C to enable Feature 1 of the device 102C. Furthermore, the voice command "DISABLE 102D F3" may be a disable command intended for device 102D to disable Feature 3 of the device 102D. Each features of the device may have a corresponding code (such as F1 or F3). Moreover, the voice command "RESTORE 102A & 102B" may be a restore command intended for devices 102A & 102B to execute restore operation. Lastly, the voice command "REPORT ALL" may be a report command intended for all devices 102 to execute restore operation. Each of the devices 102 may execute operation/s as described. Thereby, the embodiment provides the technical advantages of enabling the user 106 to perform an operation the one or more devices 102 without having knowledge about functioning of the one or more devices 102 and without knowing how an operation on the one or more devices 102 can be performed.

Figure 1B:
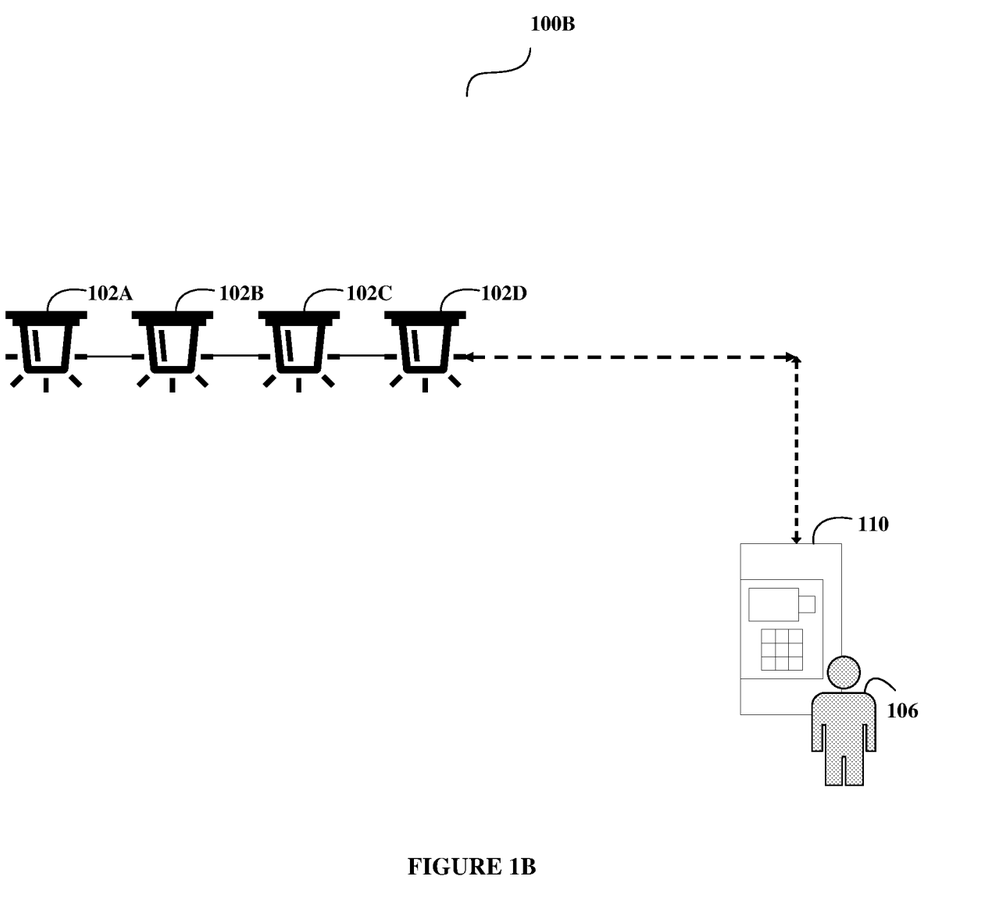
FIG. 1B depicts an exemplary system architecture according to an exemplary alternative embodiment of the invention.

FIG. 1B depicts a system architecture 100B for enabling a user to use voice commands to execute operation/s on one or more devices, according to an exemplary alternative embodiment of the invention. According to this exemplary alternative embodiment of the invention, an apparatus may be embedded inside a control panel 110. In an exemplary embodiment, the apparatus may be embedded inside the control panel 110 as a software. In another exemplary embodiment, the apparatus may be embedded inside the control panel 110 as an electronic circuitry. In yet another exemplary embodiment, the apparatus may be connected with the control panel 110 through a universal serial bus (USB).

As depicted in FIG. 1B, a user 106 may use the apparatus associated with the control panel 110 to input voice command/s. The control panel 110 may be communicably connected with one or more devices 102 either through a wired network or a wireless network. When the user 106 inputs voice command/s to the apparatus associated with the control panel 110, the apparatus associated with the control panel 110 may determine a validity of the voice command/s as explained in FIG. 1A above. If the apparatus associated with the control panel 110 determines that the voice command/s is not valid, it may notify the user 106 regarding the invalidity of the voice command/s. The user 106 may again provide a voice command/s to the control panel 110. If the apparatus associated with the control panel 110 determines that the voice command/s is valid, it may convert the voice command/s received from the user 106 to a generic command as explained in FIG. 1A above. The apparatus associated with the control panel 110 may transmit the generic command to the one or more devices 102. For this, the apparatus associated with the control panel 110 may analyze the generic command to determine an identifier of the one or more devices 102 and accordingly, the apparatus associated with the control panel 110 may transmit the generic command to an intended device 102. When the one or more devices 102 receives the generic command from the apparatus associated with the control panel 110, the one or more devices 102 may analyze the generic command to determine operation/s to be executed by the one or more devices 102 and may accordingly execute the identified operation.

The present invention encompasses the user device 104 and/or the apparatus associated with the control panel 110 to store an application in a memory and the application may already have details (such as identifier) of each of the one or more devices 102. Alternatively, the user 106 may select an option in the application for receiving such details of the one or more devices 102. Such an application may be provided by a manufacturer of the one or more devices 102 or a manufacturer of the control panel 110. Moreover, the user device 104 may also receive configurations information (such as a current version of a software run on the device 102 etc.) of the one or more devices 102 from the control panel 110 or a server (as per FIG. 1A). Further, the apparatus associated with the control panel 110 may also receive configuration information of the one or more devices 102 from the server (as per FIG. 1B). In addition, the present invention may perform authentication/authorization for the user 106 before connecting or accessing the control panel 110 through the apparatus 200. Such levels of authorization may be configured through software and provide access levels to the user 106. Such a user 106 may be a technician or any other person who wishes to perform operation/s on the one or more devices 102.

The present invention also facilitates the user 106 to search one or more devices 102 and to also search a list of operations executed by the one or more devices 102 over a period of time (such as daily, weekly, monthly or yearly). The user 106 may perform such a search in a search interface of the user device 104 (FIG. 1A) or the apparatus associated with the control panel 110 (FIG. 1B). For this, the user 106 may use a search interface of the user device 104 (FIG. 1A) or the apparatus associated with the control panel 110 (FIG. 1B) for searching the one or more devices 102 by using an identifier of the one or more devices 102. For an instance, a voice command may be provided by the user 106 to search a device 102A. For this, the user 106 may provide a voice command as "SEARCH 102A". If this voice command found valid, then, the user device 104 and/or the apparatus associated with the control panel 110 may display the device 102A through a display of the control panel 110. Alternatively, the user 106 may type an identifier of the one or more devices 102 in the search interface. Also, the user 106 may provide a voice command as "SEARCH OPERATIONS 102A". If this voice command found valid, then, the user device 104 and/or the apparatus associated with the control panel 110 may display a list of operations executed by the device 102A over a period of time. In an exemplary embodiment, the user device 104 and/or the apparatus associated with the control panel 110 may display a hierarchy (or in a tree structure) to list the each of the devices 102. For an instance, the hierarchy may start with a building number, followed by a floor number, then identifier of each devices 102 deployed at a particular floor in a particular building and then a list of operation executed by each devices 102.

The present invention enables the user 106 to use voice command/s for remotely performing any operation/s on the one or more devices 102. This would also eliminate the need of the user 106 to physically access the one or more devices 102 for performing any operation/s on the one or more devices 102. In other words, the user 106 does not need to be physically present around or near the one or more devices 102 for performing any operation/s on the one or more devices 102. By using the application on the user device 104 (as per FIG. 1A), the user 106 can easily perform any operation/s on the one or more devices 102. Also, the user 106 can remotely access the control panel 110 by using the application stored on the user device 104 (as per FIG. 1A). The present invention also facilitates the user 106 to customized one or more voice commands for filtering data related to each devices 102 and for printing the data by activating a printer installed near the user 106. Thereby, the embodiment provides the technical advantages of enabling the user 106 to remotely perform an operation on the one or more devices 102 without physically accessing the one or more devices 102 and also saves time by providing an automated solution to perform operation/s on the one or more devices 102.

Figure 2:
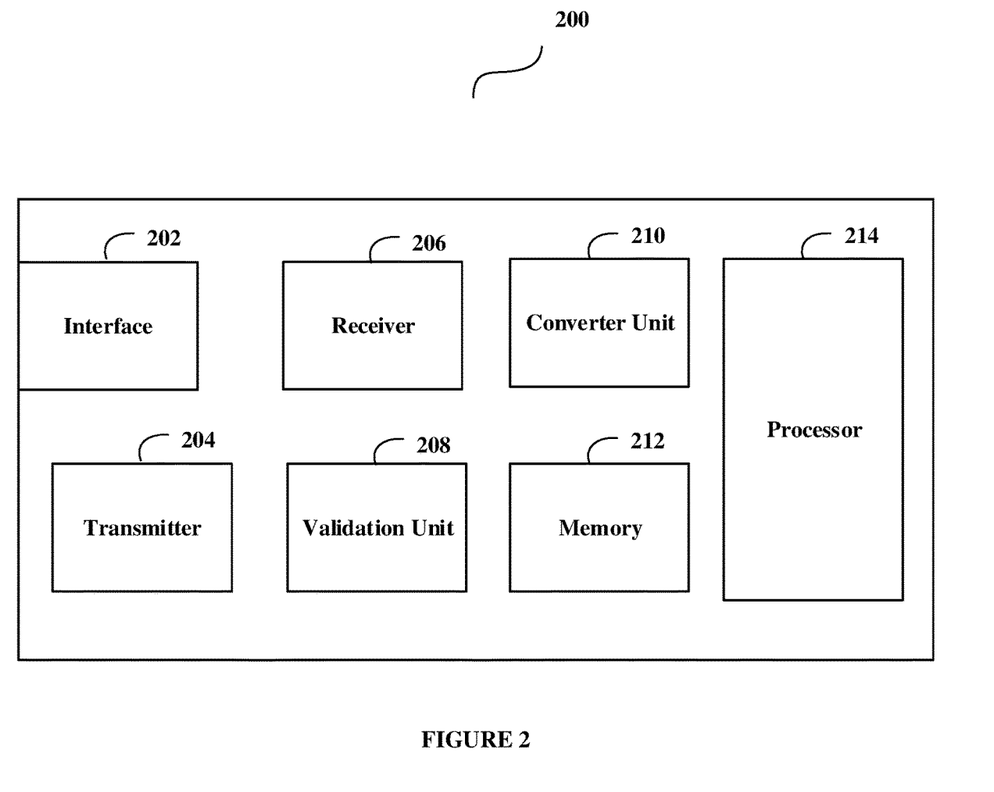
FIG. 2 depicts block diagram of different components of an apparatus according to an exemplary embodiment of the invention.

FIG. 2 depicts a block diagram of different components of an apparatus 200 according to an exemplary embodiment of the invention. The apparatus 200 may be a user device 104 (as per FIG. 1A) or an apparatus 200 embedded inside a control panel 110 (as per FIG. 1B). The apparatus 200 may comprise of, but is not limited to, an interface 202, a transmitter 204, a receiver 206, a validation unit 208, a converter unit 210, a memory 212 and/or a processor 214. The interface 202 may be adapted to receive voice command/s from a user 106. The interface 202 may communicate the voice command/s to the validation unit 208. The validation unit 208 may be adapted to determine a validity of the voice command/s as explained above. The validation unit 208 may communicate the validity of the voice command/s to the interface 202 and/or the converter unit 210. The converter unit 210 may be adapted to convert the voice command/s to a generic command if the voice command/s is valid.

Moreover, the interface 202 may further be adapted to notify the user 106 regarding the invalidity of the voice command/s and then, the user 106 may again provide a voice command/s to the user device 104. The converter unit 210 may communicate the generic command to the transmitter 204 to transmit the generic command to the control panel 110 (as per FIG. 1A) and to one or more devices 102 (as per FIG. 1B). The receiver 206 may be adapted to receive configuration information of the one or more devices 102 from the control panel 110 (as per FIG. 1A) or from a server (as per FIG. 1B). Also, the memory 212 may be adapted to store application/s, pre-defined/pre-configured voice commands and an identifier of the each one or more devices 102.

Moreover, the interface 202, the transmitter 204, the receiver 206, the validation unit 208, the converter unit 210, the memory 212 may be communicably coupled with the processor 214. The different units described herein are exemplary. The invention may be performed using one or more units. For example, the tasks executed by the interface 202, the transmitter 204, the receiver 206, the validation unit 208, the converter unit 210, the memory 212 and/or the processor 214 may be performed by a single unit. Alternatively, more number of units as described herein may be used to perform the invention.

Figure 3:
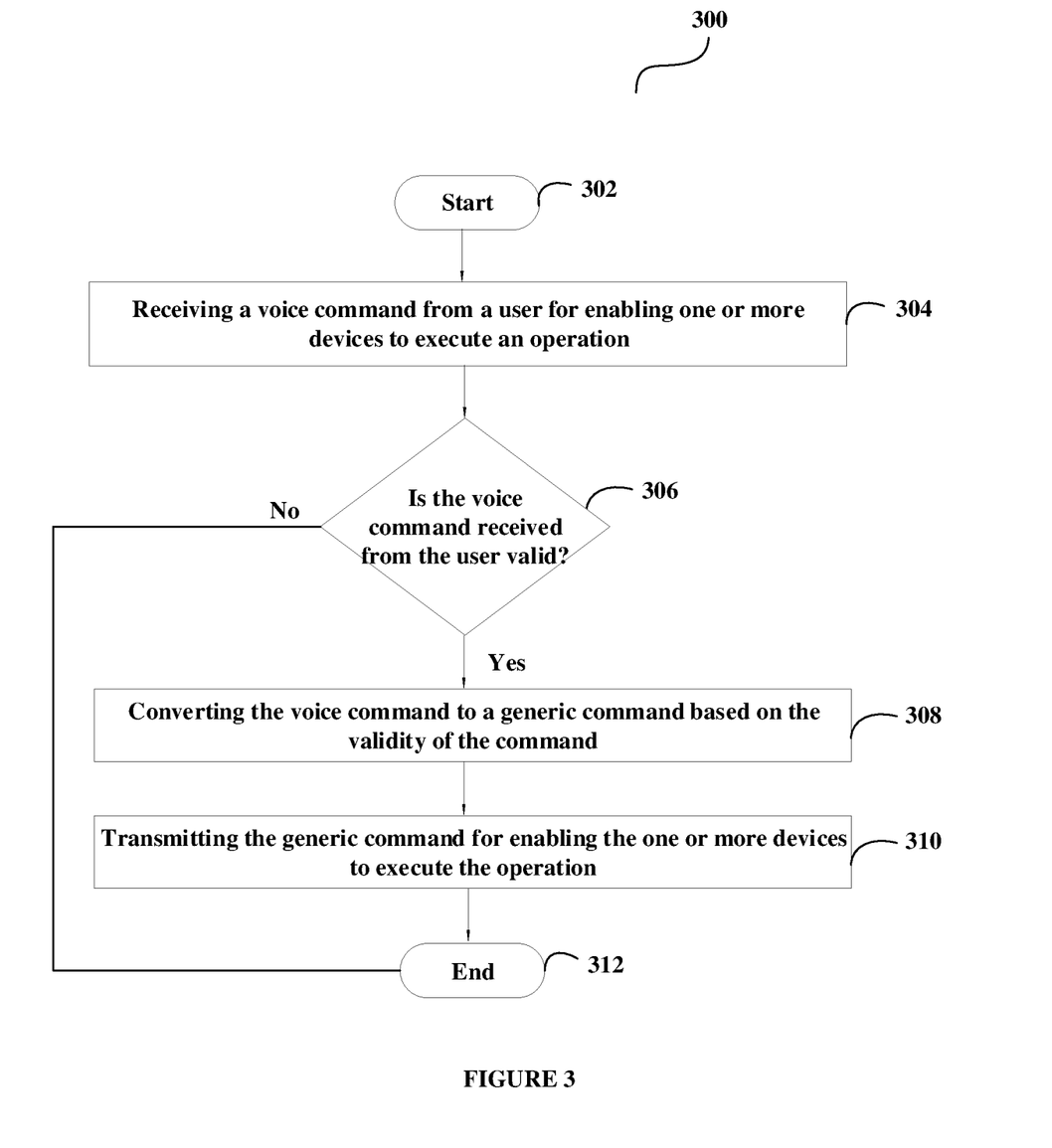
FIG. 3 depicts an exemplary flowchart illustrating a method to perform the invention according to an exemplary embodiment of the invention.

FIG. 3 depicts a flowchart outlining the features of the invention in an exemplary embodiment of the invention. The method flowchart 300 describes a method for enabling a user to use voice commands to execute operation/s on one or more devices. The method flowchart 300 starts at step 302.

At step 304, the apparatus 200 may receive voice command/s from a user 106 as discussed above.

At step 306, the apparatus 200 may determine a validity of the voice command/s as discussed above. If the voice command/s is valid, then the method flowchart 300 may move to step 308 and if the voice command/s is not valid, then the method flowchart 300 may end at step 312.

At step 308, the apparatus 200 may convert the voice command/s received from the user 106 to a generic command as discussed above.

At step 310, the apparatus 200 may transmit the generic command to the control panel 110 (as per FIG. 1A) and to one or more devices 102 (as per FIG. 1B) for enabling the one or more devices 102 to execute operation/s. Then, the method flowchart 300 may end at 312.

The present invention is applicable to various fields such as, but not limited to, malls, museums, libraries, colleges, universities, hospitals, offices and any such place or industry that is well known in the art and where the one or more devices 102 are used.

The embodiments of the invention and the tables discussed herein are exemplary and various modification and alterations to a person skilled in the art are within the scope of the invention.

In one embodiment of the invention, the invention can be operated using the one or more computer readable devices. The one or more computer readable devices can be associated with an apparatus 200. A computer readable medium comprises one or more processors and a memory coupled to the one or more processors, the memory stores instructions executed by the one or more processors. The one or more processors are configured to receive a voice command from a user 106 for enabling one or more devices 102 to execute an operation and determine validity of the voice command received from the user 106. The one or more processors are also configured to convert the voice command to a generic command based on the validity of the command and transmit the generic command for enabling the one or more devices 102 to execute the operation.

Exemplary computer readable media includes flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible and mutually exclusive to communication media. Computer storage media are implemented in hardware and exclude carrier waves and propagated signals. Computer storage media for purposes of this invention are not signals per se. Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an exemplary computing system environment, examples of the invention are capable of implementation with numerous other general purpose or special purpose computing system environments, configurations, or devices.

Examples of the invention may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the Figures/Tables and described herein. Other examples of the invention may include different computer-executable instructions or components having more or less functionality than illustrated and described herein. Aspects of the invention transform a general-purpose computer into a special-purpose computing device when configured to execute the instructions described herein.

The order of execution or performance of the operations in examples of the invention illustrated and described herein is not essential, unless otherwise specified. That is, the operations may be performed in any order, unless otherwise specified, and examples of the invention may include additional or fewer operations than those disclosed herein. For example, it is contemplated that executing or performing a particular operation before, contemporaneously with, or after another operation is within the scope of aspects of the invention.

As is employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," "data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

When introducing elements of aspects of the invention or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

We claim:

1. An apparatus comprising:
an interface adapted to receive a voice command from a user for enabling one or more devices to execute an operation;
a validation unit adapted to determine validity of the voice command received from the user;
a converter unit adapted to convert the voice command to a generic command based on the validity of the command; and
a transmitter adapted to transmit the generic command for enabling the one or more devices to execute the operation;
wherein the apparatus is a user device communicably connected with a fire control panel, wherein the apparatus transmits the generic command to the fire control panel and the fire control panel transmits the generic command to the one or more devices for enabling the one or more devices to execute the operation;
wherein the one or more devices executes an operation of enabling/disabling a feature of the one or more devices when an enable/disable command is received;
wherein the one or more devices are fire devices.

2. The apparatus of claim 1, wherein the apparatus is connected with the control panel through a bluetooth, a universal serial bus (USB), an Ethernet, or a serial interface.

3. The apparatus of claim 1, wherein the apparatus is adapted to receive configuration information for each of the one or more devices and display a list of operations executed by the one or more devices.

4. The apparatus of claim 1, wherein the apparatus provides a search interface for searching the one or more devices.

5. The apparatus of claim 1, wherein the apparatus is embedded inside a control panel.

6. The apparatus of claim 1, wherein the one or more devices execute testing operation, commissioning operation and/or maintenance operation.

7. The apparatus of claim 1, wherein the generic command for executing the operation corresponds to a test command, an activation command, a deactivation command, an enable command, a disable command a restoration command or a report command.

8. The apparatus of claim 1, wherein the one or more devices executes an operation of generating a troubleshooting report for a period of time when a report command is received.

9. The apparatus of claim 1, wherein the one or more devices executes an operation of grouping of devices when an activation command is received.

10. The apparatus of claim 1, wherein the transmitter is adapted to transmit the generic command if the voice command is valid.

11. The apparatus of claim 1, wherein the interface is adapted to provide a notification to the user if the voice command is not valid.

12. A method comprising:
   at a user device, receiving a voice command from a user for enabling one or more devices to execute an operation;
   at the user device, determining validity of the voice command received from the user;
   at the user device, converting the voice command to a generic command based on the validity of the command; and
   at the user device, transmitting the generic command from the user device to a fire control panel, the fire control panel transmitting the generic command to the one or more devices for enabling the one or more devices to execute the operation;
   wherein the one or more devices executes an operation of enabling/disabling a feature of the one or more devices when an enable/disable command is received;
   wherein the one or more devices are fire devices.

13. The method of claim 12, wherein the apparatus is connected with the control panel through a bluetooth, a universal serial bus (USB), an Ethernet, or a serial interface.

14. The method of claim 12, wherein the apparatus is embedded inside the control panel.

15. A computer readable medium comprising a non-transitory memory storing instructions executed by one or more processors, the one or more processors configured to:
   at a user device, receive a voice command from a user for enabling one or more devices to execute an operation;
   at the user device, determine validity of the voice command received from the user;
   at the user device, convert the voice command to a generic command based on the validity of the command; and
   at the user device, transmit the generic command from the user device to a fire control panel, the fire control panel transmitting the generic command to the one or more devices for enabling the one or more devices to execute the operation;
   wherein the one or more devices executes an operation of enabling/disabling a feature of the one or more devices when an enable/disable command is received;
   wherein the one or more devices are fire devices.

* * * * *